United States Patent
Kawashita

(10) Patent No.: US 8,423,880 B2
(45) Date of Patent: Apr. 16, 2013

(54) TRANSMISSION DEVICE ESTIMATION METHOD AND ESTIMATING UNIT

(75) Inventor: Mitsuya Kawashita, Osaka (JP)

(73) Assignee: Fujitsu Limited, Kawasaki (JP)

( * ) Notice: Subject to any disclaimer, the term of this patent is extended or adjusted under 35 U.S.C. 154(b) by 611 days.

(21) Appl. No.: 12/726,809

(22) Filed: Mar. 18, 2010

(65) Prior Publication Data

US 2010/0241937 A1    Sep. 23, 2010

(30) Foreign Application Priority Data

Mar. 19, 2009   (JP) .................................. 2009-68423

(51) Int. Cl.
*G06F 7/02* (2006.01)
(52) U.S. Cl.
USPC ..................................... 714/819; 375/240.27
(58) Field of Classification Search .................. 370/252, 370/230; 375/240.26, 240.27; 714/799, 714/819

See application file for complete search history.

(56) References Cited

U.S. PATENT DOCUMENTS

| | | | | |
|---|---|---|---|---|
| 6,614,763 B1 * | 9/2003 | Kikuchi et al. | ............... | 370/252 |
| 7,453,804 B1 * | 11/2008 | Feroz et al. | ................... | 370/230 |
| 7,773,677 B2 * | 8/2010 | Lee | ........................... | 375/240.27 |
| 8,169,932 B2 * | 5/2012 | Kobayashi | .................... | 370/252 |
| 2008/0084933 A1 * | 4/2008 | Lee et al. | ................. | 375/240.26 |

FOREIGN PATENT DOCUMENTS

JP    02-116240    4/1990

\* cited by examiner

*Primary Examiner* — David Ton
(74) *Attorney, Agent, or Firm* — Staas & Halsey LLP

(57) ABSTRACT

An estimating unit includes: an error detecting unit which detects an error among a plurality of frames received from an interface unit of a transmission device; a request sending unit which produces a first frame including a data collection request for requesting data collection upon the error detecting unit detecting the error, and which sends the first frame to the interface unit; an extracting unit which extracts, from the plurality of frames received from the interface unit, a second frame including the error detected by the error detecting unit and a third frame including a reply of the interface unit to the data collection request; and a saving unit in which the second frame extracted by the extracting unit is saved.

8 Claims, 13 Drawing Sheets

TRANSMISSION DEVICE ESTIMATION METHOD AND ESTIMATING UNIT

CROSS-REFERENCE TO RELATED APPLICATIONS

This application is based upon and claims the benefit of priority of the prior Japanese Patent Application No. 2009-068423, filed on Mar. 19, 2009, the entire contents of which are incorporated herein by reference.

FIELD

The embodiments discussed herein are related to a transmission device estimation method for estimating a transmission device and an estimating unit.

BACKGROUND

In a case, where a transmission device of an IP (Internet Protocol) network is estimated for example, the transmission device is estimated by means of IP packets.

FIG. 1 illustrates a configuration diagram of an example of an ordinary transmission device estimation method. In FIG. 1, a packet for estimation produced by a packet producing unit 10 is provided to an optical transceiver 13a provided in an IF (interface) unit 13 of a transmission device 12 through an optical cable 11. After being processed in the transmission device 12, the packet for estimation is output from an optical transceiver 13b of the IF unit 13, and is provided to an estimating device 15 through an optical cable 14.

The estimating device 15 accumulates provided packets for estimation. The estimating device 15 performs error detection for accumulated packets for estimation.

FIG. 2 illustrates a configuration diagram of another example of the ordinary transmission device estimation method. In FIG. 2, packets for estimation produced by the packet producing unit 10 are provided to the optical transceiver 13a provided in the IF unit 13 of the transmission device 12 through the optical cable 11. After being processed in the transmission device 12, the packets for estimation are output from an optical transceiver 13c of the IF unit 13, and are provided to an optical transceiver 18a provided in an IF unit 18 of a transmission device 17 through an optical cable 16. The IF unit 18 performs a simple error detection process for the provided packets. The IF unit 18 turns on an LED 19 provided in the IF unit 18 for an error indication in case of detecting an error.

As a related art, Japanese Laid-open Patent Publication No. 02-116240 discloses an art such that a packet communication device measures a quantity of flowing from a terminal and abandons a packet of a call of the terminal in a case where the terminal does not obey a declared quantity of flowing.

SUMMARY

According to an aspect of the invention, an estimating unit includes: an error detecting unit which detects an error among a plurality of frames received from an interface unit of a transmission device; a request sending unit which produces a first frame including a data collection request for requesting data collection upon the error detecting unit detecting the error, and which sends the first frame to the interface unit; an extracting unit which extracts, from the plurality of frames received from the interface unit, a second frame including the error detected by the error detecting unit and a third frame including a reply of the interface unit to the data collection request; and a saving unit in which the second frame extracted by the extracting unit is saved.

According to another aspect of the invention, a transmission device estimation method for estimating a transmission device includes: detecting an error among a plurality of frames received from an interface unit of the transmission device; producing a first frame including a data collection request for requesting a data collection upon the error detecting unit detecting the error and sending the first frame to the interface unit; extracting, from the plurality of frames received from the interface unit, a second frame including the error detected by the error detecting unit and a third frame including a reply of the interface unit to the data collection request; and saving the extracted second frame in a saving unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Figure 1:
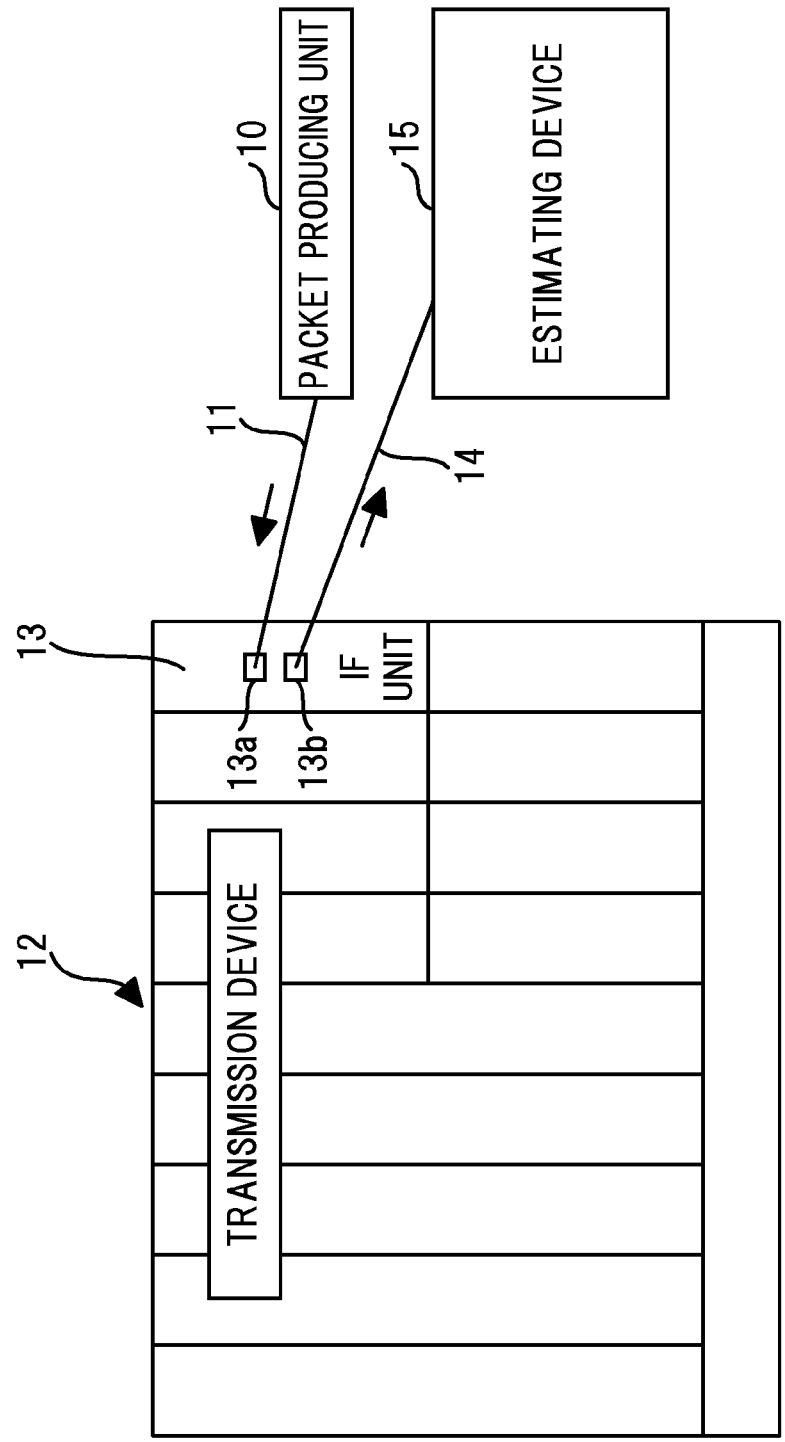
FIG. 1 is a configuration diagram of an example of a related art transmission device estimation method.

According to the related art illustrated in FIG. 1, when the transmission device 12 is estimated, the estimating device 15 takes in, accumulates, and estimates all the transmitted packets for estimation. Thus, the transmission device 12 is desirably provided with a large quantity of packets for estimation for measuring an error of a very low frequency of occurrence. As a large quantity of packets for estimation is accumulated in the estimating device 15 in this case, a problem possibly occurs where a memory of the estimating device 15 for accumulating packets overflows and a target packet may not be obtained. The target packet mentioned here is a packet which produces an error of a very low frequency of occurrence.

There is another problem in that, when an error is detected for a packet for estimation accumulated in the estimating device 15, a voltage of the transmission device 12 or of the IF unit 13 and environmental data such as temperature at the time of an output of the packet for estimation for which an error is detected may not be collected.

Figure 2:
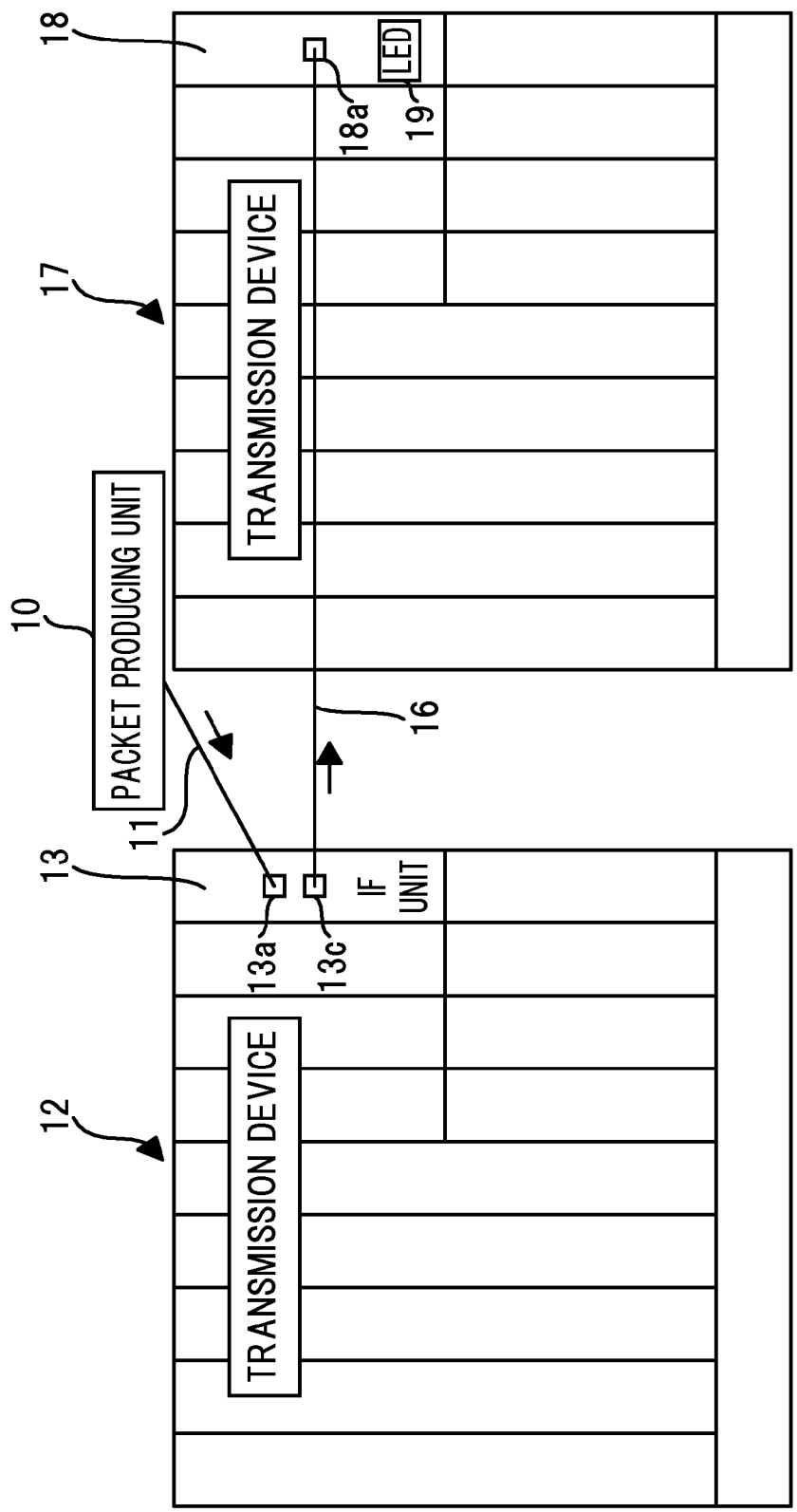
FIG. 2 is a configuration diagram of another example of the related art transmission device estimation method.

Further, if the optical transceiver 13c of the IF unit 13 is connected to the optical transceiver 18a of the IF unit 18 of the transmission device 17 through the optical cable 16 as illustrated in FIG. 2, the estimating device 15 may not be connected to the optical transceiver 18a of the IF unit 18. There is a problem in this case in that only an error detection process where an LED 19 is turned on for an error indication may be performed.

An embodiment will be explained with reference to the drawings hereafter.

Configuration of Transmission Device

Figure 3:
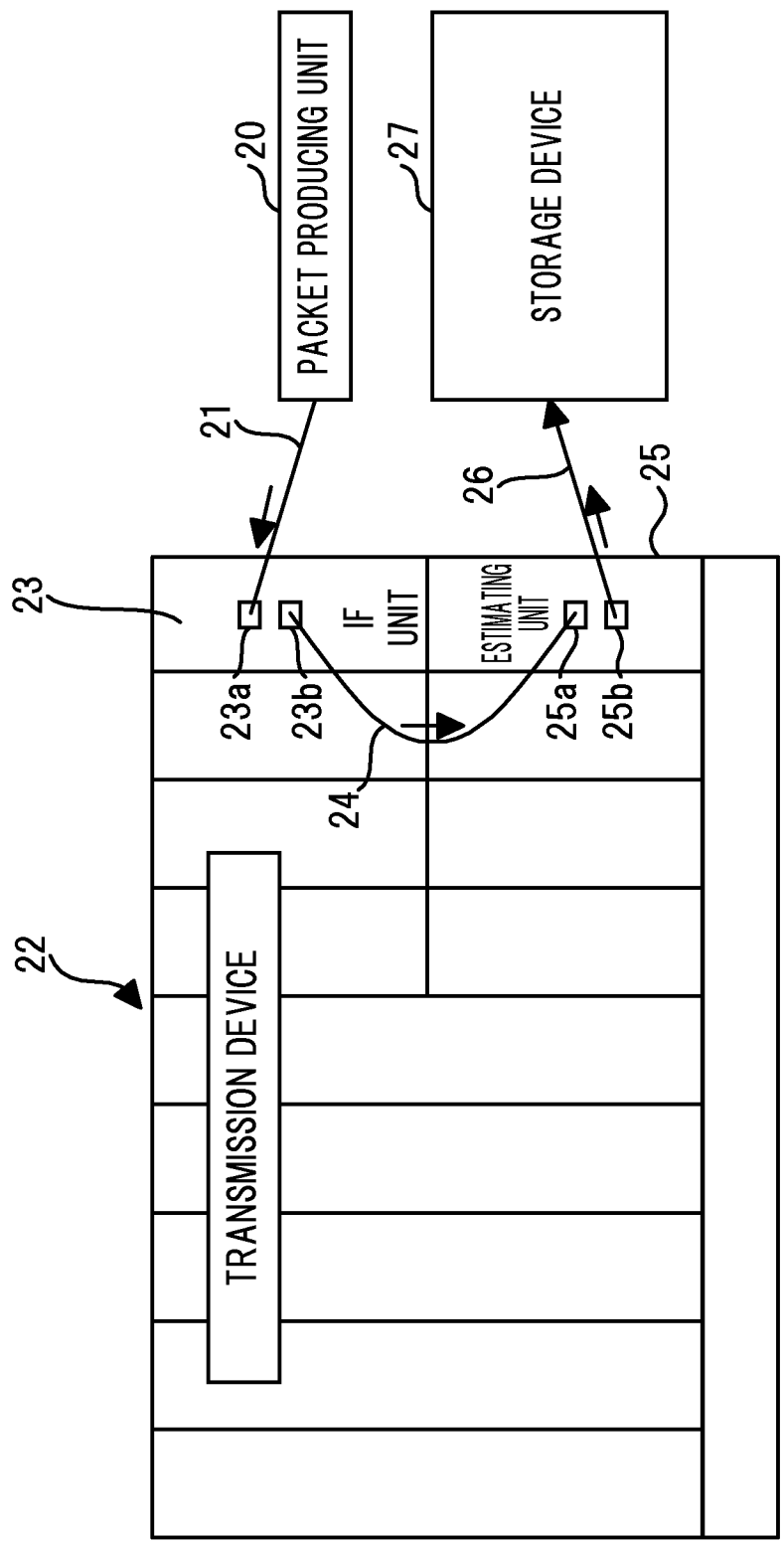
FIG. 3 is a configuration diagram of an embodiment of a transmission device having an estimating unit.

FIG. 3 illustrates a configuration diagram of an embodiment of a transmission device having an estimating unit. In FIG. 3, a frame (or a packet) for estimation produced by a packet producing unit 20 is provided to an optical transceiver 23a provided in an IF unit 23 of a transmission device 22 through an optical cable 21. After being processed by the IF unit 23 in the transmission device 22 or by another unit in the transmission device 22, the packet for estimation is output from an optical transceiver 23b of the IF unit 23 to an optical transceiver 25a through an optical cable 24 and is provided to an estimating unit 25 in the transmission device 22. An optical transceiver 25b of the estimating unit 25 is connected to a storage device 27 through an optical cable 26. The estimating unit 25 may not be connected to the storage device 27.

Configuration of Estimating Unit

Figure 4:
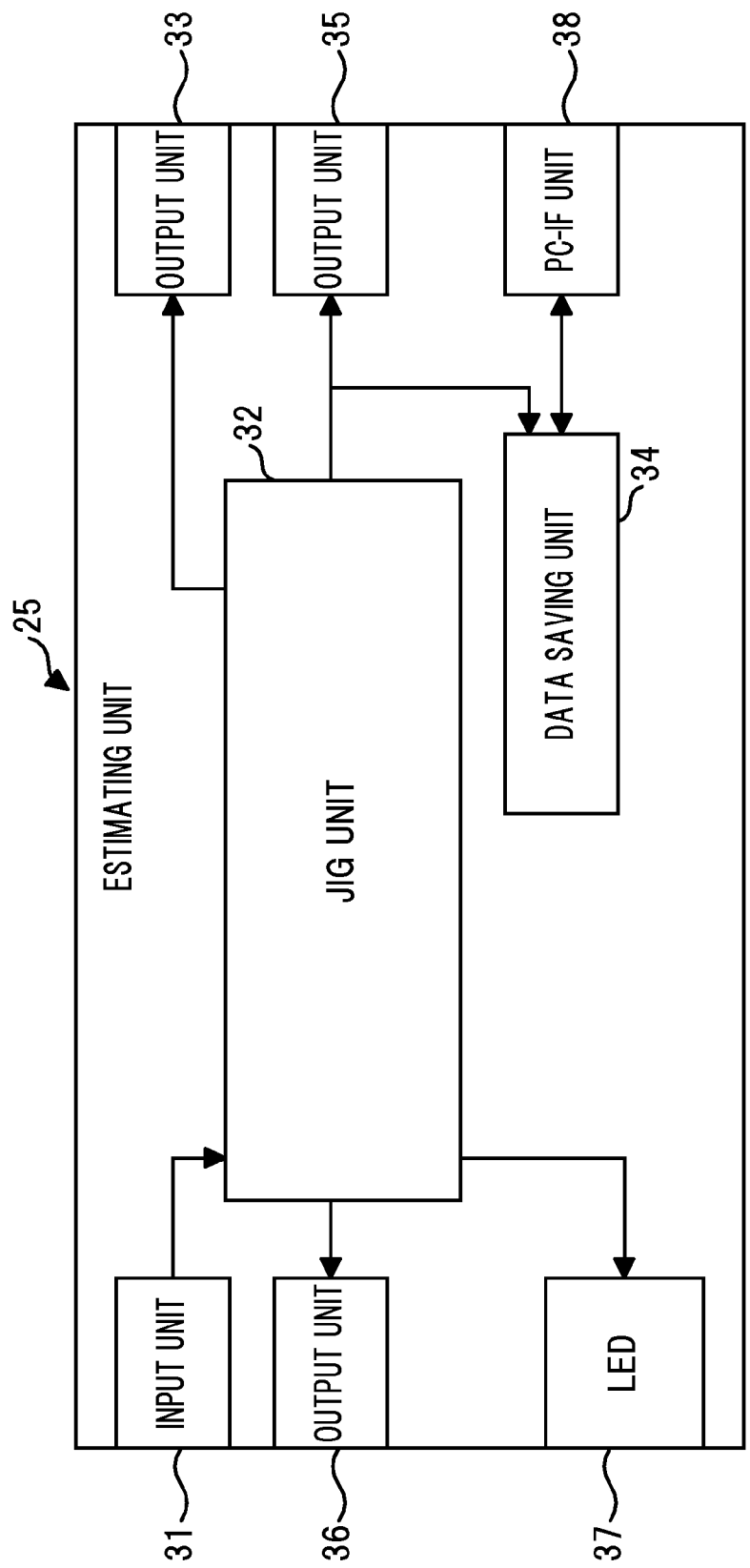
FIG. 4 is a configuration diagram of an embodiment of the estimating unit.
Figure 5:
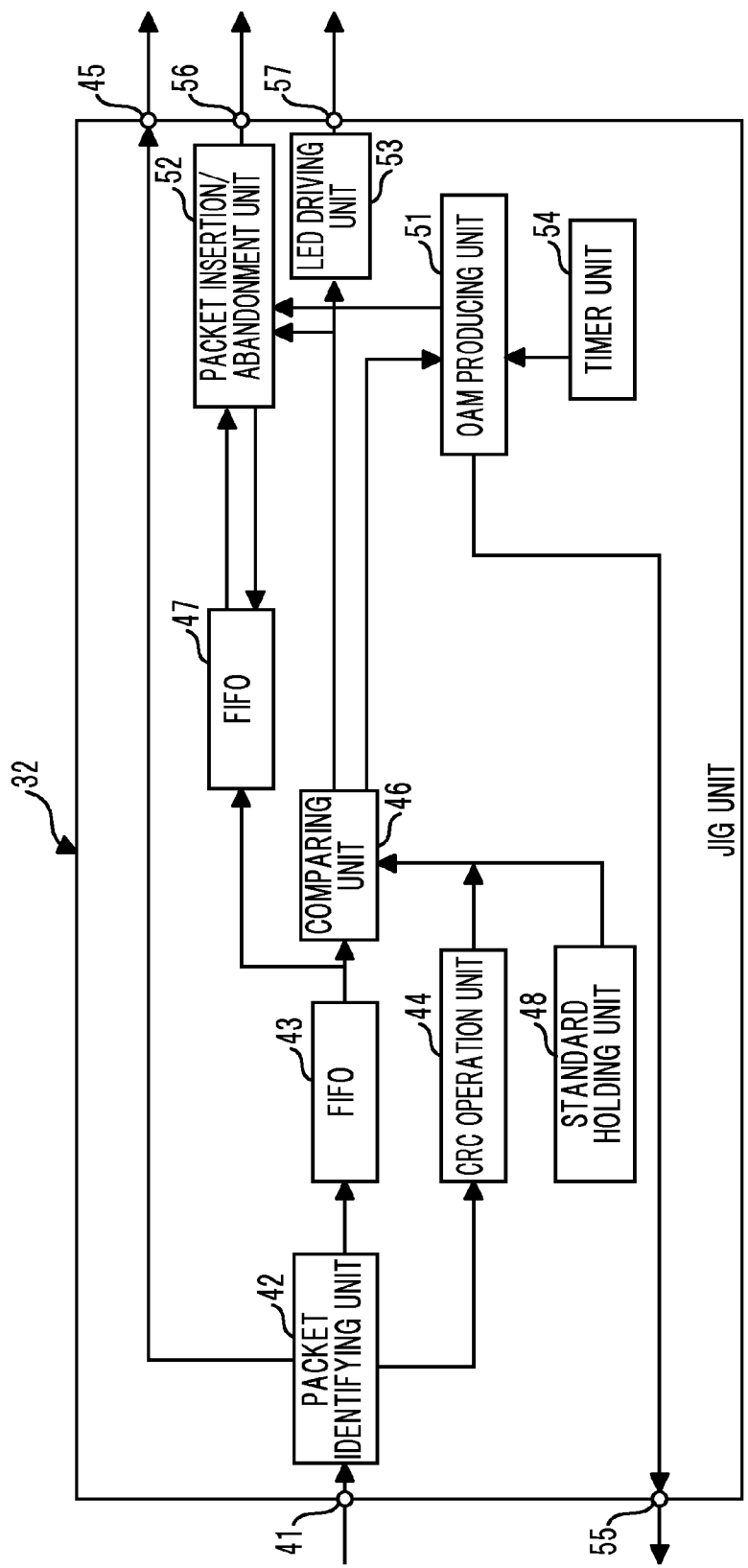
FIG. 5 is a configuration diagram of an embodiment of a jig unit in the estimating unit.

FIG. 4 illustrates a configuration diagram of an embodiment of the estimating unit 25. FIG. 5 illustrates a configuration diagram of an embodiment of a jig unit 32 in the estimating unit 25.

In FIG. 4, an input unit 31, which corresponds to the optical transceiver 25a, converts an optical signal provided from the optical cable 24 into an electric signal and provides the jig unit 32 with the electric signal. An output unit 33 converts an electric signal of a main signal provided by the jig unit 32 into an optical signal and outputs the optical signal.

The jig unit 32 extracts a frame of a packet for estimation for which an error is detected or a frame of a response OAM packet described later. The jig unit 32 provides a data saving unit 34 with the extracted frame so that the extracted frame is saved (accumulated) in the data saving unit 34. The jig unit 32 provides an output unit 35 with the extracted frame. The output unit 35 corresponds to the optical transceiver 25b. The output unit 35 converts a provided electric signal into an optical signal and provides the storage device 27 with the optical signal through the optical cable 26 for data storage (accumulation).

The storage device 27 illustrated in FIG. 3 corresponds to the function of the data saving unit 34 illustrated in FIG. 4 provided outside the estimating unit 25. If the data saving unit 34 is provided, it is unnecessary to connect the storage device 27. Further, if the storage device 27 is connected and used, it is unnecessary to provide the data saving unit 34.

The data saving unit 34 is connected to an external computer which is not illustrated through a PC (personal computer)-IF unit 38. The external computer reads and analyzes what is saved in the data saving unit 34.

Further, upon detecting an error of a packet for estimation, the jig unit 32 produces an OAM (Operation, Administration, & Management) packet, and provides an output unit 36 with a frame of the OAM packet. The output unit 36, which corresponds to the optical transceiver 25a, converts an electric signal of the frame of the OAM packet into an optical signal, and provides the IF unit 23 with the optical signal through the optical cable 24. Further, upon detecting an error of a frame of a packet for estimation, the jig unit 32 turns on an LED (light emitting diode) 37 arranged on a front panel of the transmission device for indication.

Configuration of Jig Unit

In FIG. 5, a frame (electric signal) of a received packet is input from the input unit 31 illustrated in FIG. 4 to a terminal 41 and provided to a packet indentifying unit 42. The packet indentifying unit 42 identifies whether the provided received packet is a reply OAM packet, e.g., an OAM packet with which the IF unit 23 replied to a data collection request OAM packet produced by an OAM producing unit 51, by detecting a source address and an ether type.

If the OAM packet is a reply OAM packet, the packet indentifying unit 42 provides a FIFO 43 and a CRC operation unit 44 with the reply OAM packet. If it is an ordinary packet other than a reply OAM packet, e.g., a packet for estimation, the packet indentifying unit 42 provides the FIFO 43 and the CRC operation unit 44 with the packet and provides the output unit 33 with the packet through a terminal 45.

The FIFO 43 buffers the frame of the received packet and provides a comparing unit 46 and a FIFO 47 with the frame of the received packet. The CRC operation unit 44 carries out an error detection code operation. The CRC operation unit 44 calculates a CRC (Cyclic Redundancy Check) value from a destination address to data of the received packet, and provides the comparing unit 46 with the CRC value.

Figure 6:
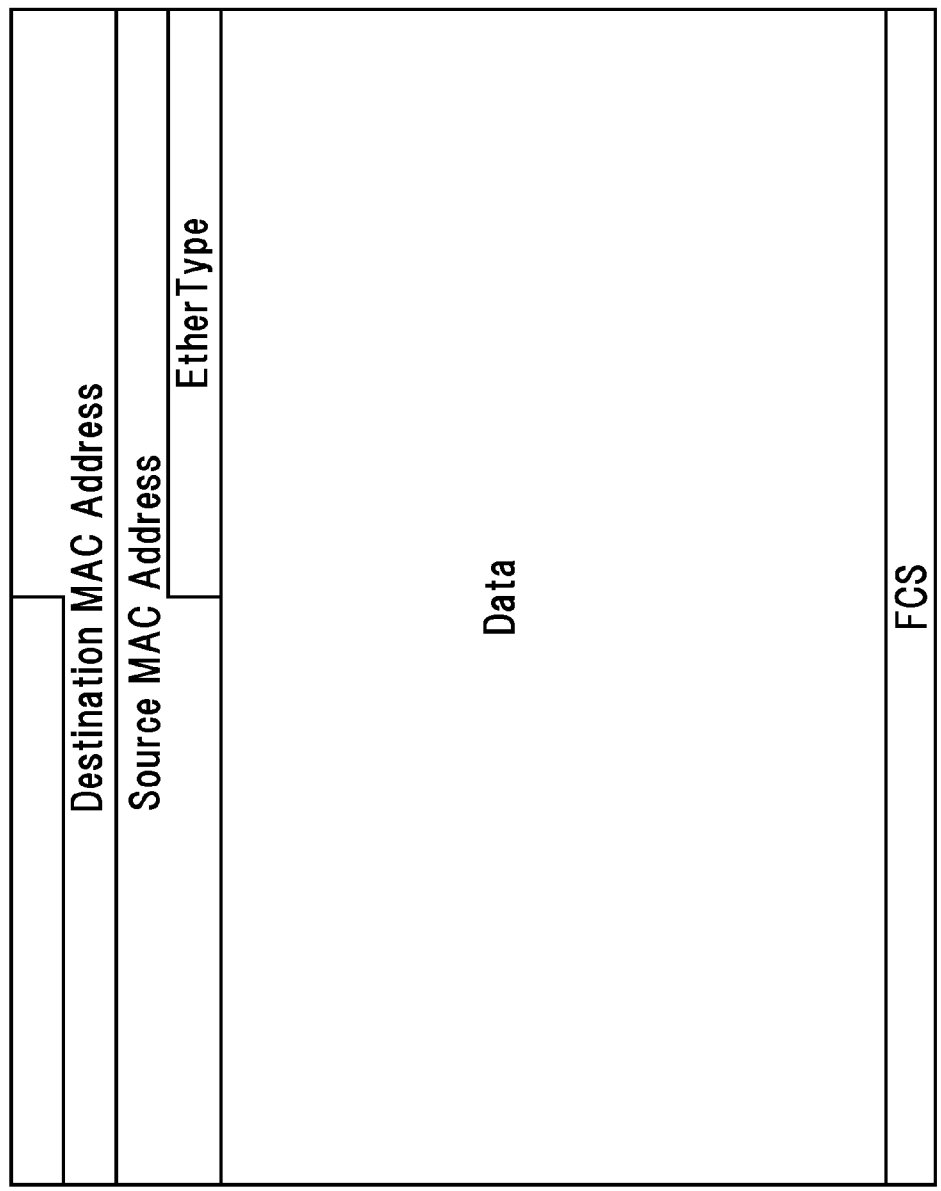
FIG. 6 illustrates a frame format of a received packet.

FIG. 6 illustrates a frame format of a received packet. The frame format includes a preamble at the head followed by fields of a destination address (Destination MAC Address), a source address (Source MAC Address), and an ether type (Ether Type) provided as a header. In the frame format, the header is followed by a data (Data) field, and an FCS (Frame Check Sequence) field. The data field includes an IP packet as data, and the FCS includes a CRC value (code data for error correction) calculated from the values from the destination address to the data.

A standard holding unit 48 holds an address of the IF unit 23 as the source address. The standard holding unit 48 provides the comparing unit 46 with the source address (address of the IF unit 23) as a standard value. The source addresses in the frame of the packet for estimation provided by the IF unit 23 to the estimating unit 25 and in the frame of the reply OAM packet are the address of the above IF unit 23.

The standard holding unit 48 is configured to hold the destination address, a plurality of types of ether types that the packet for estimation or the reply OAM packet may take as a standard value in addition to the source address (address of the IF unit 23), and to provide the comparing unit 46 with the standard value.

The comparing unit 46 compares the CRC value provided by the CRC operation unit 44 with an FCS field value of a frame of a received packet output by the FIFO 43 concurrently with the output of the CRC operation unit 44, so as to identify an agreement. Further, the comparing unit 46 compares the source address of the frame of the received packet with the source address provided by the standard holding unit 48 so as to identify an agreement.

If the standard holding unit 48 holds for example the destination address, the comparing unit 46 also identifies an agreement between the destination address of the frame of the received packet and the source address of the standard holding unit 48. The comparing unit 46 notifies the OAM producing unit 51, a packet insertion/abandonment unit 52, and an LED drive unit 53 individually of the results of identifying the agreements.

Upon being notified of a disagreement by the comparing unit 46, the OAM producing unit 51 produces a data collection request OAM packet for requesting the IF unit 23 to collect temperature data or voltage data. At this time, the OAM producing unit 51 includes time data provided by a timer unit 54 in the OAM packet. A frame of the data collection request OAM packet produced here is provided to the output unit 36 through a terminal 55. The OAM producing unit 51 notifies the packet insertion/abandonment unit 52 of an output of the data collection request OAM packet.

Figure 7:
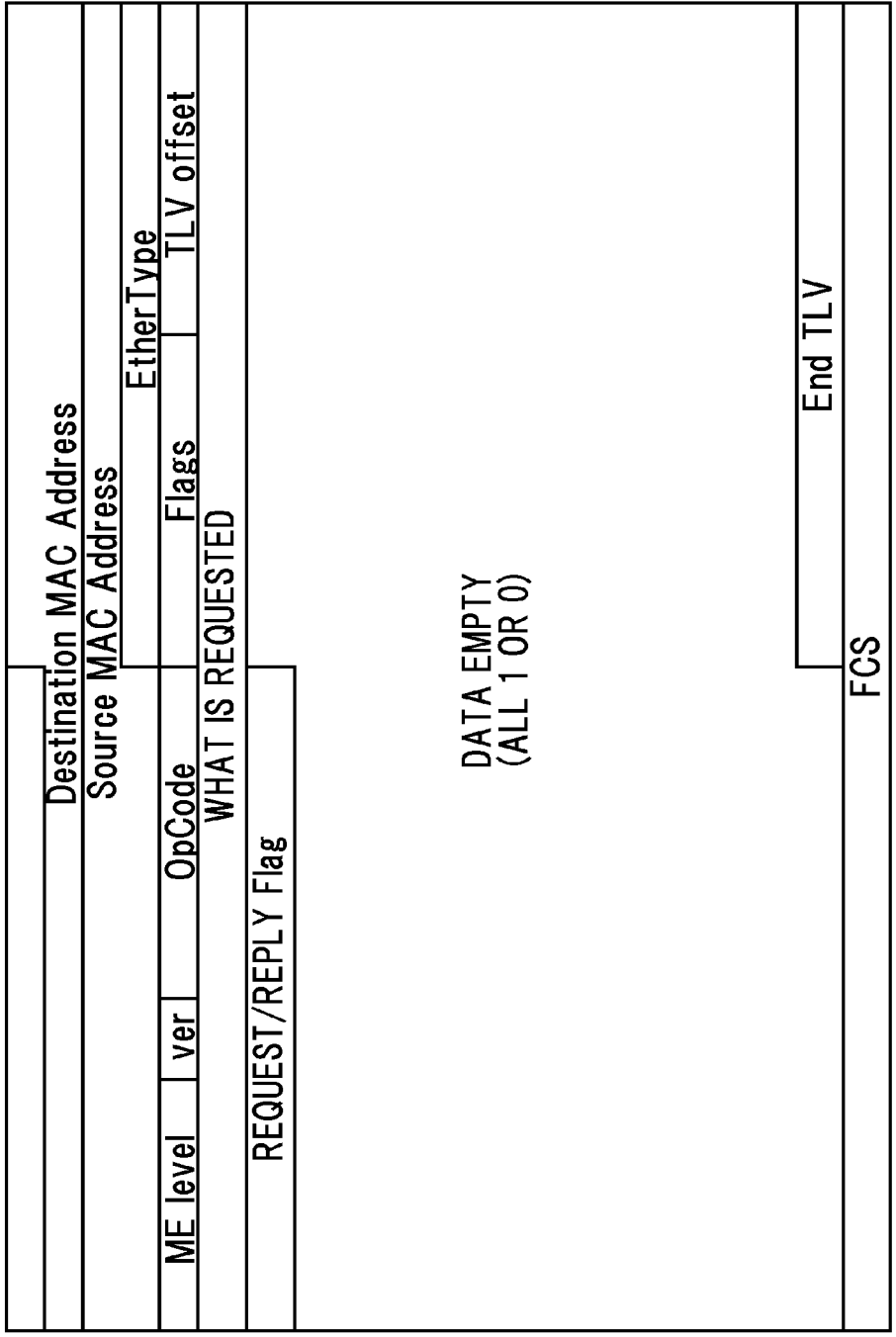
FIG. 7 illustrates a frame format of a data collection request OAM packet.

FIG. 7 illustrates a frame format of the data collection request OAM packet. The frame format includes a preamble at the head followed by fields of a destination address (Destination MAC Address), a source address (Source MAC Address), and an ether type (Ether Type).

In the frame format, the above fields are followed by various OAM data fields. Fields of "ME level," "ver," and "OpCode" indicate OAM level data, a version, and an operation code that indicate the type of OAM messages, respectively. Further, fields of "Flags," and "TVL offset" are provided. Further, fields of "What is requested" and "Request/Reply Flag" are provided. Requested data such as temperature and voltage and time data are set to "What is requested." A request is set to the "Request/Reply Flag."

A data (Data) field is empty (ALL 1 or 0). A field of "End TVL" is provided next to the data field, and then an FCS field is provided. A CRC value calculated from values from the destination address to "End TVL" is saved in the "FCS" field.

Figure 8:
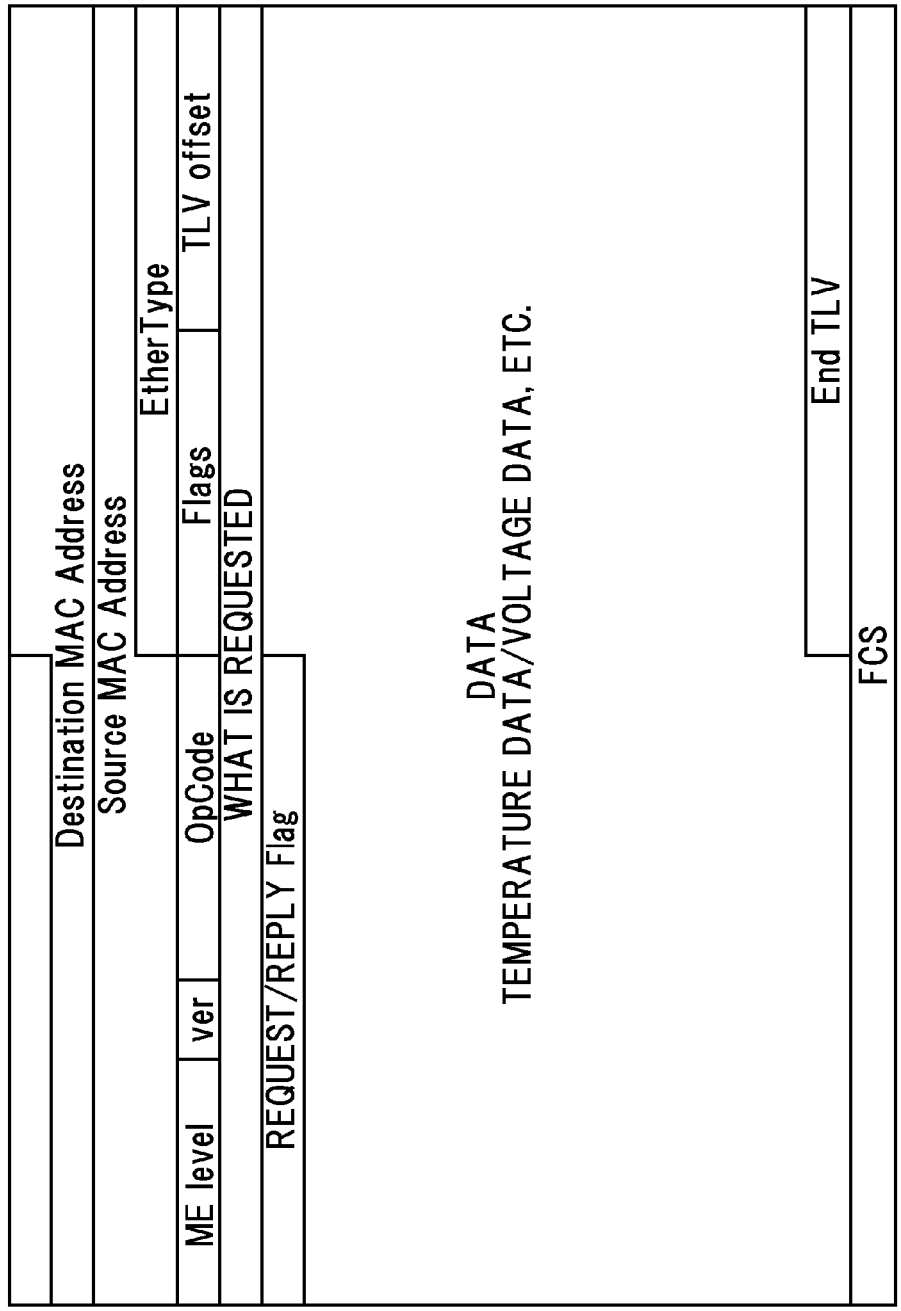
FIG. 8 illustrates a frame format of a reply OAM packet.

FIG. 8 illustrates a frame format of the reply OAM packet. The frame format includes a preamble at the head followed by fields of a destination address (Destination MAC Address), a source address (Source MAC Address), and an ether type (Ether Type).

In the frame format, the above fields are followed by various OAM data fields. Fields of "ME level," "ver," and "OpCode" indicate OAM level data, a version, and an operation code that indicates the kinds of OAM messages, respectively. Further, fields of "Flags," and "TVL offset" are provided. Further, fields of "What is requested" and "Request/Reply Flag" are provided. Requested data such as temperature and voltage and time data which are copied from the data collection request OAM packet are set to "What is requested." A reply is set to the "Request/Reply Flag."

In a data (Data) field, data such as temperature data and voltage data collected in accordance with what is requested are saved. A field of "End TVL" is provided next to the data field, and then an "FCS" field is provided. A CRC value calculated from values of the destination address to End TVL is saved in the "FCS" field.

If the packet insertion/abandonment unit 52 illustrated in FIG. 5 is notified of an agreement from the comparing unit 46 and the received packet input to the FIFO 47 concurrently with the output of the comparing unit 46 is a reply OAM packet, the packet insertion/abandonment unit 52 reads the packet for estimation held in the FIFO 47 and the reply OAM packet, and sends the read packets from a terminal 56 to the data saving unit 34 and the output unit 35 illustrated in FIG. 4. If the received packet input to the FIFO 47 concurrently with the output of the comparing unit 46 is a packet for estimation, the packet insertion/abandonment unit 52 abandons the packet for estimation.

If the packet insertion/abandonment unit 52 is notified of a disagreement from the comparing unit 46 and the received packet input to the FIFO 47 concurrently with the output of the comparing unit 46 is a reply OAM packet, the packet insertion/abandonment unit 52 abandons the reply OAM packet. If the received packet input to the FIFO 47 concurrently with the output of the comparing unit 46 is a packet for estimation, the packet insertion/abandonment unit 52 holds the packet for estimation in the FIFO 47.

Upon being notified of a disagreement from the comparing unit 46, the LED drive unit 53 produces a driving signal for turning the LED on, and provides the LED 37 with the driving signal so as to turn the LED 37 on for indication.

Flowchart of Jig Unit

Figure 9:
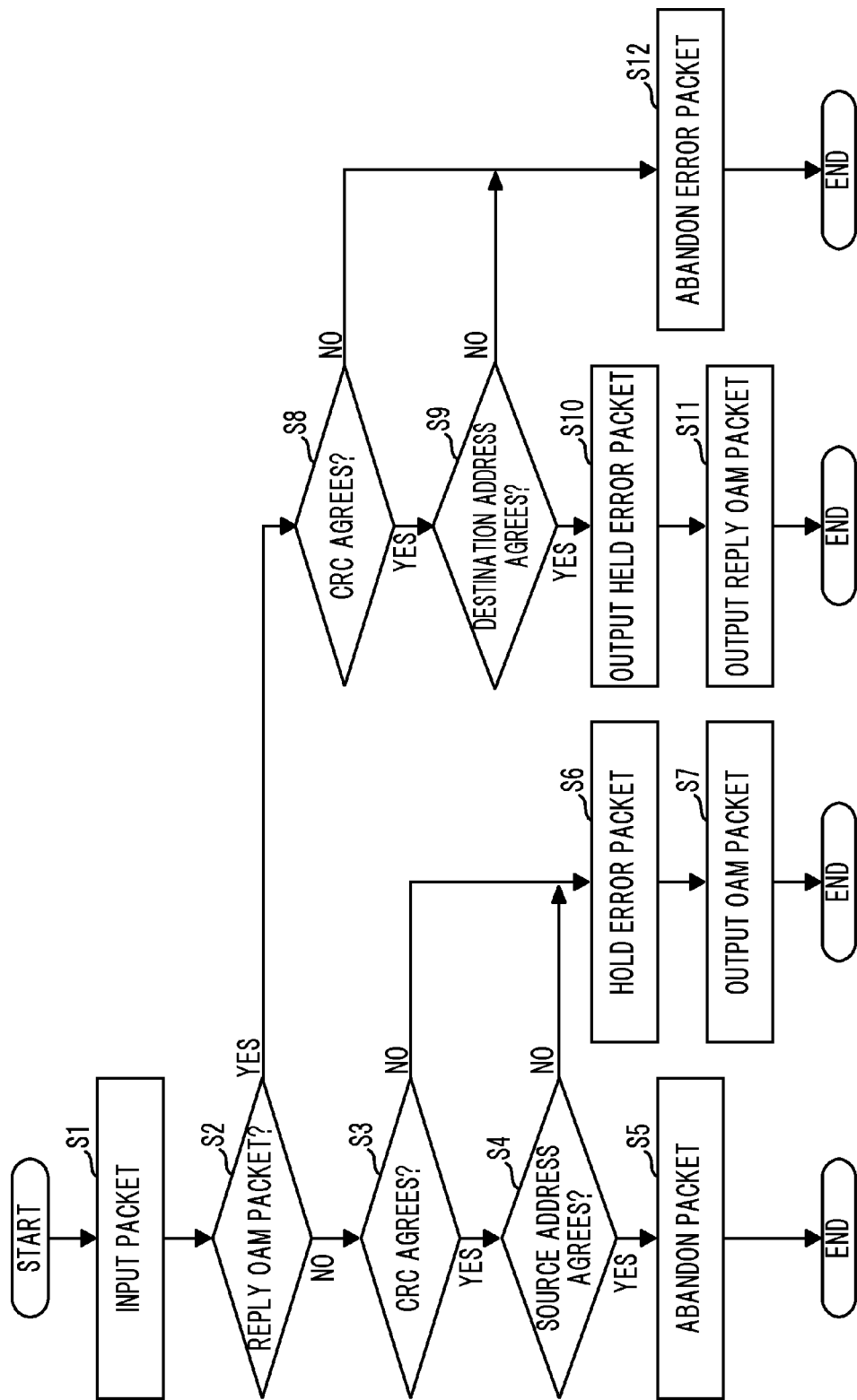
FIG. 9 is a flowchart of an embodiment of a process performed by the jig unit.

FIG. 9 illustrates a flowchart of an embodiment of a process performed by the jig unit 32. In FIG. 9, a frame of a received packet is input at step S1, and the packet indentifying unit 42 identifies whether the received packet is a reply OAM packet at step S2.

If the received packet is not a reply OAM packet, e.g., the received packet is a packet for estimation, the comparing unit 46 identifies whether a CRC value of an FCS of the packet for estimation agrees with a CRC value output by the CRC operation unit 44 at step S3. In case of an agreement at the step S3, the comparing unit 46 identifies whether a source address and so on of the packet for estimation agree with a source address and so on output by the standard holding unit 48 at step S4. In case of an agreement at the step S4, the packet insertion/abandonment unit 52 abandons the packet for estimation at step S5.

In case of a disagreement at the step S3 or S4, the FIFO 47 holds the packet for estimation including an error at step S6. The OAM producing unit 51 produces the data collection request OAM packet and outputs the data collection request OAM packet from the terminal 55 at step S7.

Meanwhile, if the received packet is a reply OAM packet at the step S2, the comparing unit 46 identifies whether the CRC value of the FCS of the reply OAM packet agrees with the CRC value output by the CRC operation unit 44 at a step S8. In case of an agreement at the step S8, the comparing unit 46 identifies whether the source address and so on of the reply OAM packet agrees with the source address and so on output by the standard holding unit 48 at step S9. In case of an agreement at the step S9, the packet insertion/abandonment unit 52 outputs the packet for estimation held in the FIFO 47 from the terminal 56 at step S10, and the packet insertion/abandonment unit 52 outputs the reply OAM packet from the terminal 56 at step S11.

In case of a disagreement at the step S8 or S9, the packet insertion/abandonment unit 52 abandons the erroneous reply OAM packet at step S12.

Configuration of Data Collecting Unit

Figure 10:
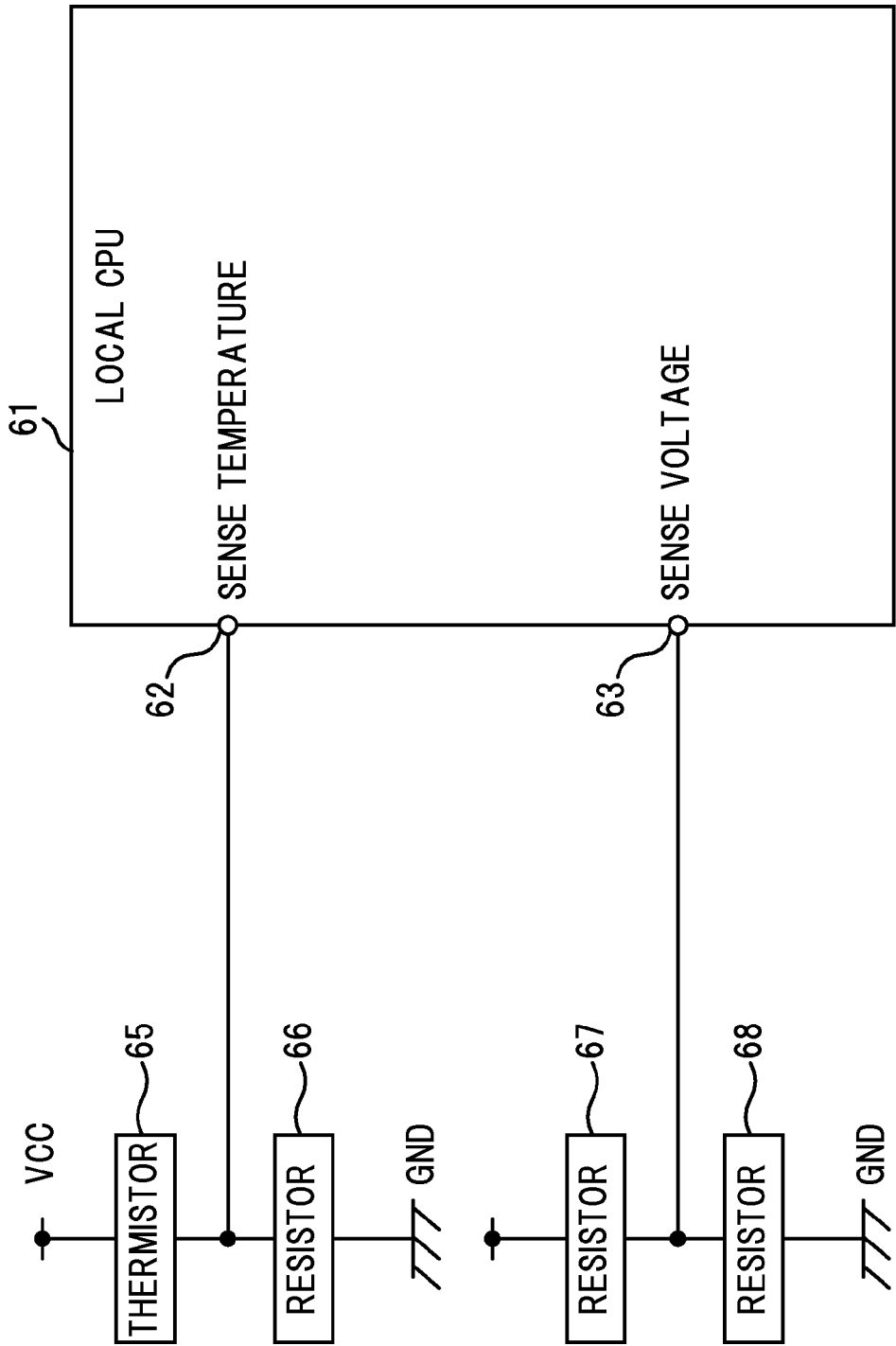
FIG. 10 is a configuration diagram of an embodiment of a data collecting unit in the IF unit.

FIG. 10 illustrates a configuration diagram of an embodiment of a data collecting unit included in the IF unit 23. In FIG. 10, a local CPU 61 includes an AD-converter, and input signals provided to analog input terminals 62 and 63 are AD-converted and are taken into the local CPU 61.

An end and another end of a thermistor 65 provided at a measurement position are connected to a power supply VCC and an end of a resistor 66, respectively. Another end of the resistor 66 is grounded. An interface between the thermistor 65 and the resistor 66 is connected to the analog input terminal 62. As temperature rises, a resistance value of the thermistor 65 increases and a voltage of the analog input terminal 62 decreases. The local CPU 61 takes in the voltage as temperature data of the measurement position.

Further, resistors 67 and 68 are connected in series between the power supply VCC and a ground GND. An interface between the resistors 67 and 68 is connected to the analog input terminal 63. The voltage of the power supply VCC is divided by the resistors 67 and 68, and the divided value of the voltage is taken into the local CPU 61 as voltage data of the measurement position. A dividing ratio of the resistors 67 and 68 is determined in such a way that the voltage provided to the analog input terminal 63 of the local CPU 61 is in a voltage range that may be input to the analog input terminal 63.

Configuration of if Unit

Figure 11:
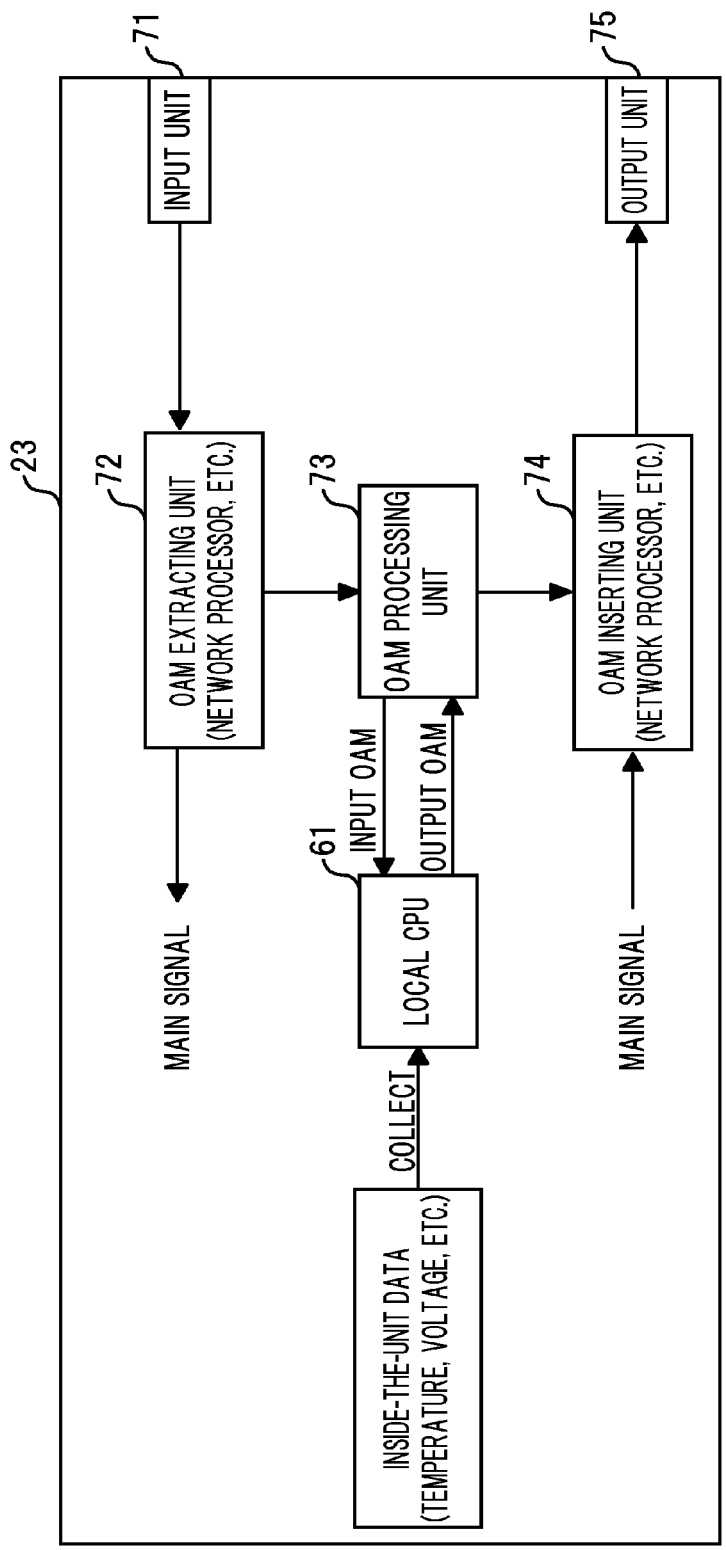
FIG. 11 is a configuration diagram of an embodiment of a packet reply function in the IF unit.

FIG. 11 illustrates a configuration diagram of an embodiment of a packet reply function in the IF unit 23. In FIG. 11, an input unit 71, which corresponds to the optical transceiver 23b, converts an optical signal provided from the optical cable 24 into an electric signal and provides an OAM extracting unit 72 with the electric signal.

The OAM extracting unit 72, which is made up by, e.g., a network processor, extracts a frame of the data collection request OAM packet provided from the estimating unit 25 (refer to FIG. 7) and provides an OAM processing unit 73 with the extracted frame. Further, the OAM extracting unit 72 provides a following circuit with a packet of a main signal except the data collection request OAM packet.

The OAM processing unit 73 provides the local CPU 61 with the extracted data collection request OAM packet. The local CPU 61 is illustrated in FIG. 10. The local CPU 61 analyzes the data collection request OAM packet, and reads internal data such as temperature and voltage data of the measurement position and so on in accordance with what is requested of the data collection request OAM packet. The local CPU 61 produces a frame of a reply OAM packet including the collected temperature and voltage data (refer to FIG. 8), and provides the OAM processing unit 73 with the produced frame. The reply OAM packet may copy and include time data included in the data collection request OAM packet.

The OAM processing unit 73 provides an OAM inserting unit 74 with the reply OAM packet. The OAM inserting unit 74 is made up by, e.g., a network processor. The OAM inserting unit 74 inserts the reply OAM packet into a main signal packet and provides an output unit 75 with the reply OAM packet. The output unit 75, which corresponds to the optical transceiver 23b, converts an electric signal provided from the OAM inserting unit 74 to an optical signal, and transmits the optical signal to the optical cable 24 bound for the estimating unit 25.

According to the above embodiment, only a packet for estimation in which an error occurs and a reply OAM packet including temperature and voltage data collected from the IF unit 23 upon the error occurring are saved in the data saving unit 34 or the storage device 27, and a packet for estimation without an error is abandoned. Thus, a memory size of the data saving unit 34 or the storage device 27 may be significantly reduced in comparison with the ordinary estimating device 15. Further, as the time data is copied in the reply OAM packet from the data collection request OAM packet, the packets for estimation in which errors occurred corresponding to the reply OAM packet may be identified.

Thus, the packet may be held in the data saving unit 34 or the storage device 27 at the time of detecting an error even if the error occurs infrequently. Further, as data collection is requested upon the error being detected, a state of the error and the surrounding data may be held in the data saving unit 34 or the storage device 27 and monitored even while being estimated for a long time.

Modification of Transmission Device

Figure 12:
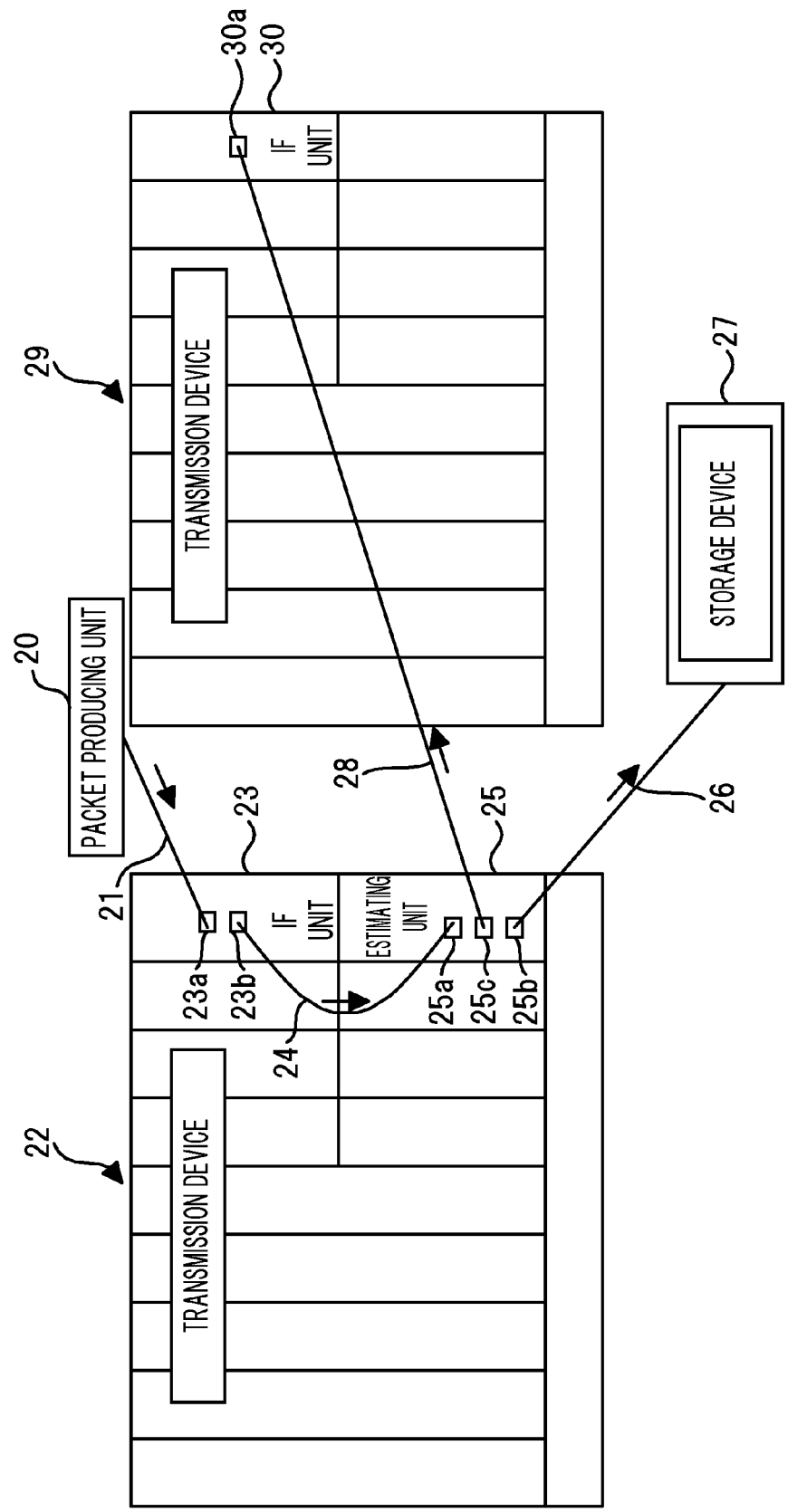
FIG. 12 is a configuration diagram of a modification of an embodiment of a transmission device having an estimating unit.

FIG. 12 illustrates a configuration diagram of a modification of an embodiment of a transmission device having an estimating unit. In FIG. 12, a frame of a packet for estimation produced by the packet producing unit 20 is provided to the optical transceiver 23a provided in the IF unit 23 of the transmission device 22 through the optical cable 21. The packet for estimation is processed in the transmission device 22, multiplexed with the main signal in operation so as to be output from the optical transceiver 23b of the IF unit 23, and provided from the optical transceiver 25a (which corresponds to the input unit 31) to the estimating unit 25 through the optical cable 24.

The optical transceiver 25b (which corresponds to the output unit 35) of the estimating unit 25 is connected to the storage device 27 by the optical cable 26. An optical transceiver 25c of the estimating unit 25 corresponds to the output unit 33, and converts an electric signal of a main signal packet in operation provided from the jig unit 32 into an optical signal and outputs the optical signal. The main signal packet output from the optical transceiver 25c is provided to an optical transceiver 30a provided in an IF unit 30 of a transmission device 29 through an optical cable 28.

The transmission device 22 may be estimated through this configuration even while the transmission devices 22 and 29 are connected to each other and in operation.

According to the above embodiment, the CRC operation unit 44, the comparing unit 46, and a standard holding unit 48 are used as an example of an error detecting unit, the OAM producing unit 51 is used as an example of a request sending unit, the packet insertion/abandonment unit 52 is used as an example of an extracting unit, the storage device 27 or the data saving unit 34 is used as an example of a saving unit, the packet identifying unit 42 and the output unit 33 are used as an example of an output unit, the CRC operation unit 44 is used as an example of an operation unit, and the standard holding unit 48 is used as an example of a standard holding unit.

Another Configuration of Jig Unit

The embodiments illustrated in FIGS. 3 and 12 illustrate the configurations in which the transmission devices 22 and 29 are a transmission device of an IP (Internet Protocol) network. Whereas, FIG. 13 illustrates a configuration in which the transmission devices 22 and 29 are a transmission device of a SONET (Synchronous Optical Network) or SDH (Synchronous Digital Hierarchy) network.

Figure 13:
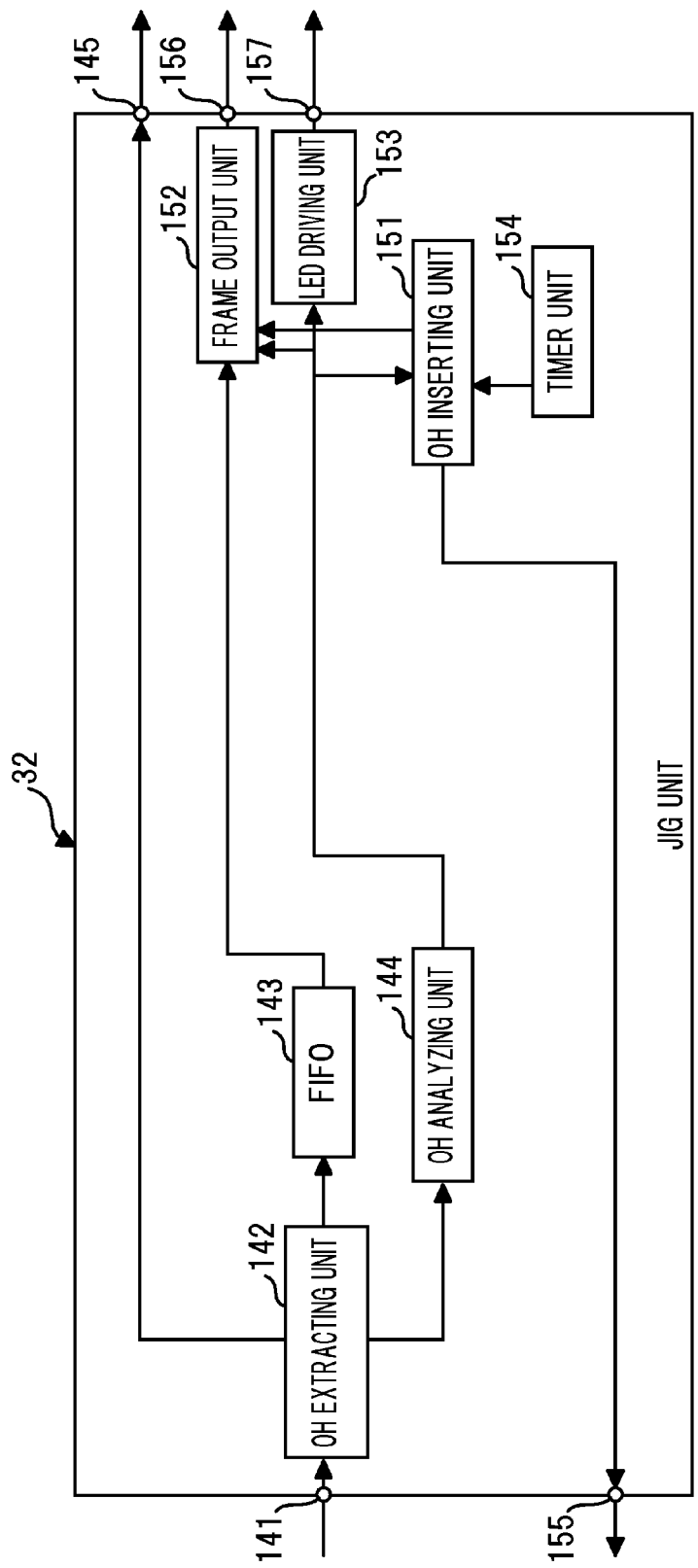
FIG. 13 is a configuration diagram of another embodiment of the jig unit in the estimating unit.

FIG. 13 illustrates a configuration diagram of another embodiment of the jig unit 32 in the estimating unit 25. In FIG. 13, an SDH frame of an electric signal is input from the input unit 31 illustrated in FIG. 4 to a terminal 141, and is provided to an OH (overhead) extracting unit 142. The OH extracting unit 142 extracts an overhead, e.g., SOH (Selection OverHead), POH (Path OverHead), provides a FIFO 143 with the SDH frame, provides the output unit 33 with the SDH frame from a terminal 145, and provides an OH analyzing unit 144 with the extracted SOH and POH.

The OH analyzing unit 144 detects a B1 byte error from a B1 byte of SOH, and detects a B3 byte error from a B3 byte of POH. The OH analyzing unit 144 produces an error detection signal when detecting the B1 byte error or the B3 byte error, and provides an OH inserting unit 151, a frame output unit 152, and an LED driving unit 153 with the error detection signal. Further, upon detecting temperature data or voltage data included on a channel for maintenance of, e.g., F2 byte of POH, the OH analyzing unit 144 produces a data detection signal and provides the frame output unit 152 with the data detection signal.

Upon being provided with the error detection signal from the OH analyzing unit 144, the OH inserting unit 151 produces an SDH frame for which a data collection request for requesting the IF unit 23 to collect temperature or voltage data is inserted into the channel for maintenance of F2 byte of, e.g., POH of an overhead of the main signal. At this time, time data provided from a timer unit 154 in the data collection request is included. The SDH frame is provided from a terminal 155 to the output unit 36 illustrated in FIG. 4.

Upon being provided with the error detection signal from the OH analyzing unit 144, the frame output unit 152 outputs, from a terminal 156, an SDH frame provided by the FIFO 143 concurrently with the output of the OH analyzing unit 144. Further, upon being provided with the data detection signal from the OH analyzing unit 144, the frame output unit 152 outputs, from the terminal 156, the SDH frame provided by the FIFO 143 concurrently with the output of the OH analyzing unit 144. Moreover, upon being provided with no error detection signal or data detection signal from the OH analyzing unit 144, the frame output unit 152 abandons the SDH frame output from the FIFO 143.

Upon being provided with the error detection signal from the OH analyzing unit 144, the LED driving unit 153 produces a driving signal for turning the LED 37 on and provides the LED 37 with the driving signal so as to turn the LED 37 on for indication.

Also for SDH, as described above, only an SDH frame in which an error occurs and an SDH frame including temperature and voltage data collected from the IF unit 23 upon the error occurring and the time data copied from the data collection request are saved in the data saving unit 34 or the storage device 27. Thus, a memory size of the data saving unit 34 or the storage device 27 may be significantly reduced in comparison with the related art estimating device 15. Upon an error being detected even if the error occurs least frequently, the packet may be held in the data saving unit 34 or the storage device 27 at the time of error detection. This is also true for SONET.

According to the embodiment, the OH analyzing unit is used as an example of an error detecting unit, the OH inserting unit 151 is used as an example of a request sending unit, the frame output unit 152 is used as an example of an extracting unit, and the storage device 27 or the data saving unit 34 is used as an example of a saving unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An estimating unit comprising:
    an error detecting unit which detects an error among a plurality of frames received from an interface unit of a transmission device;
    a request sending unit which produces a first frame including a data collection request for requesting data collection upon the error detecting unit detecting the error, and which sends the first frame to the interface unit;
    an extracting unit which extracts, from the plurality of frames received from the interface unit, a second frame including the error detected by the error detecting unit and a third frame including a reply of the interface unit to the data collection request; and
    a saving unit in which the second frame extracted by the extracting unit is saved.

2. The estimating unit according to claim 1, further comprising
    an output unit which outputs the plurality of frames received from the interface unit except the third frame including the reply of the interface unit.

3. The estimating unit according to claim 1, wherein the error detecting unit further includes:
    an operation unit which performs an error detection code operation by using the plurality of frames received from the interface unit; and
    a comparing unit which compares error detection code data added to the plurality of frames received from the interface unit with an error detection code value output by the operation unit so as to detect an error when a disagreement occurs.

4. The estimating unit according to claim 3, wherein the error detecting unit further includes:
    a standard holding unit which holds a standard value of a certain data item included in the plurality of frames received from the interface unit, wherein
    the comparing unit compares a value of the certain data item of the plurality of frames received from the interface unit with the standard value held by the standard holding unit so as to detect an error when a disagreement occurs.

5. A transmission device estimation method for estimating a transmission device, comprising:
    detecting an error among a plurality of frames received from an interface unit of the transmission device;
    producing a first frame including a data collection request for requesting a data collection upon the error detecting unit detecting the error, and sending the first frame to the interface unit;
    extracting, from the plurality of frames received from the interface unit, a second frame including the error detected by the error detecting unit and a third frame including a reply of the interface unit to the data collection request; and
    saving the second frame in a saving unit.

6. The transmission device estimation method according to claim 5, further comprising
    outputting the plurality of frames received from the interface unit except the third frame including the reply of the interface unit.

7. The transmission device estimation method according to claim 5, wherein the error detection includes
    performing an error detection code operation by using the plurality of frames received from the interface unit, and
    comparing error detection code data added to the plurality of frames received from the interface unit with an error detection code value obtained in the error detection code operation so as to detect an error when a disagreement occurs.

8. The transmission device estimation method according to claim 7, wherein the error detection includes
    holding a standard value of a certain data item included in the plurality of frames received from the interface unit in a standard saving unit, and
    comparing a value of the certain data item of the plurality of frames received from the interface unit with the standard value so as to detect an error when a disagreement occurs.

* * * * *